July 8, 1969  W. A. FARRAND ETAL  3,454,857
SYNCHRONOUS MOTOR WITH SEGMENTED STATOR
Filed Dec. 15, 1966  Sheet 1 of 2

INVENTORS
WILLIAM A. FARRAND
ROBERT B. HORSFALL
BY Robert G Rogers
ATTORNEY

INVENTORS
WILLIAM A. FARRAND
ROBERT B. HORSFALL

ATTORNEY

United States Patent Office 3,454,857
Patented July 8, 1969

3,454,857
SYNCHRONOUS MOTOR WITH SEGMENTED STATOR
William A. Farrand, Fullerton, and Robert Bruce Horsfall, Placentia, Calif., assignors to North American Rockwell Corporation
Filed Dec. 15, 1966, Ser. No. 601,952
Int. Cl. H02k 19/06, 19/08; H02p 3/18
U.S. Cl. 318—166                 8 Claims

ABSTRACT OF THE DISCLOSURE

A sychronous motor with segmented stator portions driven by independent power supplies wherein sensing means are provided with each stator portion for maintaining proper phase alignment between each of the portions.

DESCRIPTION OF PRIOR ART

Field of the invention

A synchronous motor comprising segmented stator portions and phase synchronizing sensing means.

Description of prior art

Present art synchronous motors comprise a single stator portion which encompasses the rotor. Although the performance of such a motor is satisfactory, certain uses require fitting the motor into a certain package shape and reducing the weight relative to what could be achieved with the unitary stator and rotor embodiment. It is desirable to be able to reduce physical properties of a motor without interfering with its operational characteristics.

By separating the stator into segments and eliminating so much of each segment, including wiring and iron, as is not required to drive the rotor for the particular application involved, a more desirable motor form may be produced.

A motor having segmented stator portions may be "over-designed" for its running condition to improve starting torque while minimizing running power requirements by de-energizing certain segments after synchronous speed has been attained. Preferably, the de-energized segments should be symmetrically disposed. Provisions for excess starting torque capability also permit a design in which failure of one or more power supplies connected to individual segments may occur without causing the motor to stop.

In constructing a motor with segmented stator it is necessary to assure that the segments be electrically synchronized as though they were portions of a solid stator. This may be accomplished by careful mechanical adjustment of the separate segments relative to each other during assembly. However, any residual inaccuracy in such adjustment or disturbances of the adjustment due to subsequent shock, vibration, temperature or other environmental changes may impair the electrical operation of the motor. Under such circumstances the residual magnetic pattern impressed on the rotor by one segment may be sufficiently out of phase with the magnetic pattern generated by a succeeding segment so that the latter will cause a change in the residual pattern of magnetization at the expense of reduced efficiency and increased hysteresis loss. When optimum relative synchronization of the magnetic patterns of the separate segments is attained, the running balance of the motor is improved by more perfect equalization of the various tangential force impulses and the losses are minimized for maximum efficiency.

BRIEF DESCRIPTION OF THE INVENTION

Briefly, the present invention provides a synchronous motor having separated or segmented stator members driven by independent power supplies and provided with a phase alignment sensor means to permit electrical adjustment of the phase alignment between the individual segments and the pattern of residual magnetism in the rotor. Switch means may be interposed between each stator portion and the power supplies. By opening one switch and closing the other the supply which is disconnected from a sensor provides a phase reference for the other supplies.

Therefore, it is an object of this invention to provide a relatively compact and light-weight synchronous motor having segmented stator portions which are phase aligned for efficient operation of the motor and located for mechanical convenience.

It is another object of this invention to provide an improved synchronous motor having phase synchronized segmented stator portions.

It is still a further object of this invention to provide an improved synchronous motor having a plurality of independent stator segments disposed for driving the rotor with minimum hysteresis power loss.

These and other objects of this invention will become more apparent in connection with the following drawings of which,

DESCRIPTION OF THE PREFERRED EMBODIMENT

Figure 1:
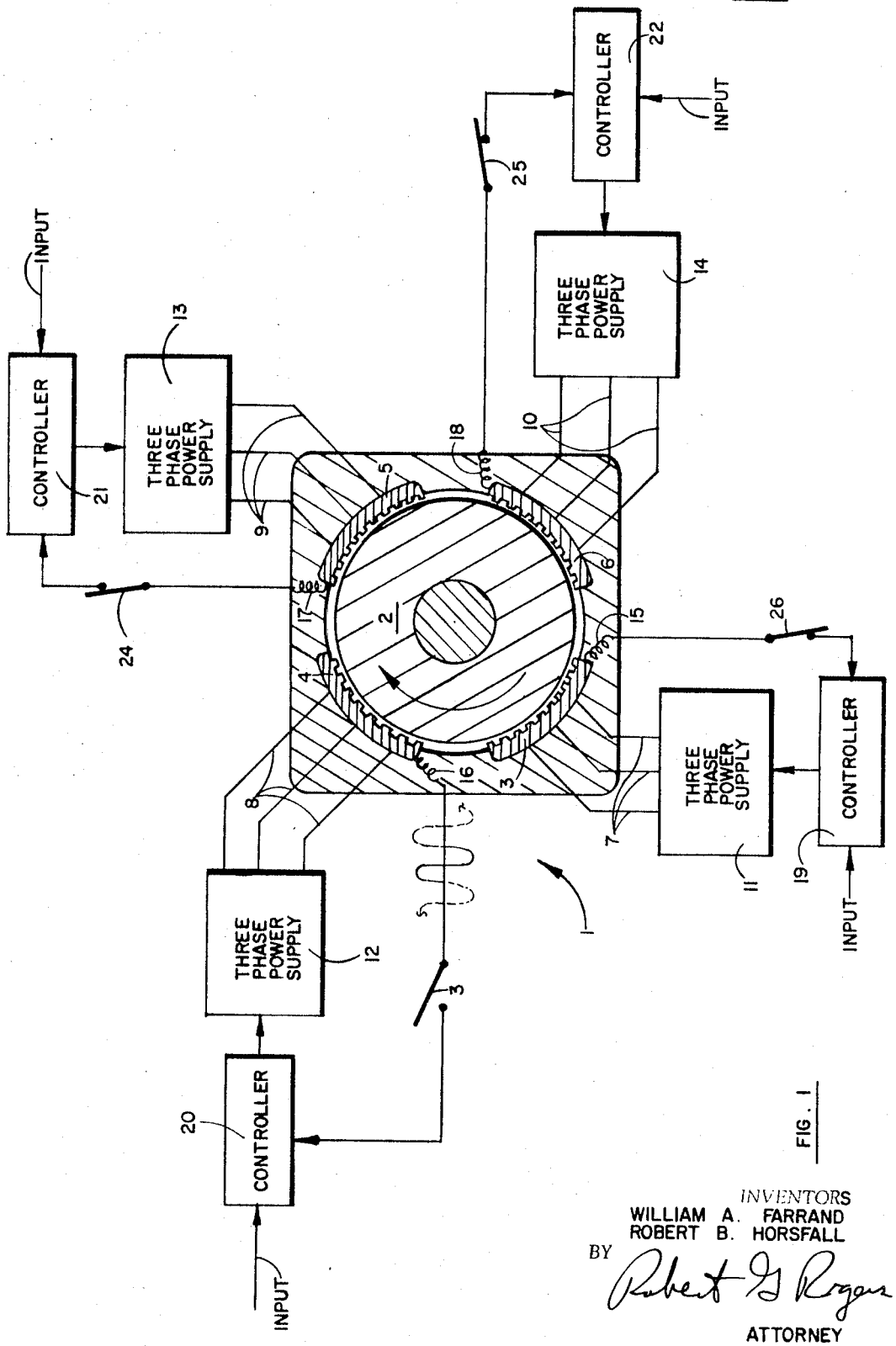
FIGURE 1 contains one embodiment of a synchronous motor having segmented stators.

Referring now to FIGURE 1, wherein is shown a representation of a preferred embodiment of the invention comprising motor 1, including rotor 2, and stator segments 3, 4, 5 and 6. Each stator segment comprises a core of magnetizable material such as iron having polyphase windings 7, 8, 9 and 10 connected to power supplies 11, 12, 13 and 13 and 14 respectively. The rotor comprises a disc or ring of magnetically hard and electrically conductive material such as used in existing hysteresis-synchronous motors. Although three phase windings and power supplies are shown, any plurality of phases could be used in other embodiments.

Each power supply is basically synchronized with the frequency of an input signal by each of controllers 19, 20, 21 and 22. A controller is connected to each power supply. The input signal may be derived from commercial or other power lines or generated by a stable local oscillator unit of any known type. For example, the controller may be a phase-locked oscillator which receives a DC input signal and provides a 400 cycle single phase AC signal to a three-phase power supply (12, 13, 14, 11). The 400 cycle signal is phase locked or synchronized to the phase of the input pulse signal from a selected switch (3, 24, 25, 26).

Phase lock oscillators are widely described in the literature. One illustration of a phase locked oscillator which can be used as a controller herein is illustrated by R. D. Huntoon, "Synchronization of Oscillators," Proc. IRE, vol. 35, pp. 1415–1423, December 1947, in FIGURE 3. In that example, the B+ input to the RFC coil corresponds to the input to a controller (19, 20, 21, 22) shown in FIGURE 1 of the present invention. Similarly, the output to the driving oscillator of the Huntoon illustration corresponds to the input to the three-phase power supply of the present invention.

Another phase lock oscillator can be seen by referring to the illustration by L. J. Paciorek, "Injection Locking of Oscillators," Proc. IEEE, vol. 63, No. 11, pages 1723–1727, November 1965. The EL input corresponds to the pulse signal input to a controller from a coil (15, 16, 17, 18) of the present invention. The input to the tuning circuit on the plate of Paciorek's triode corresponds to the input to a controller from an external source shown in FIGURE 1.

Figure 2:
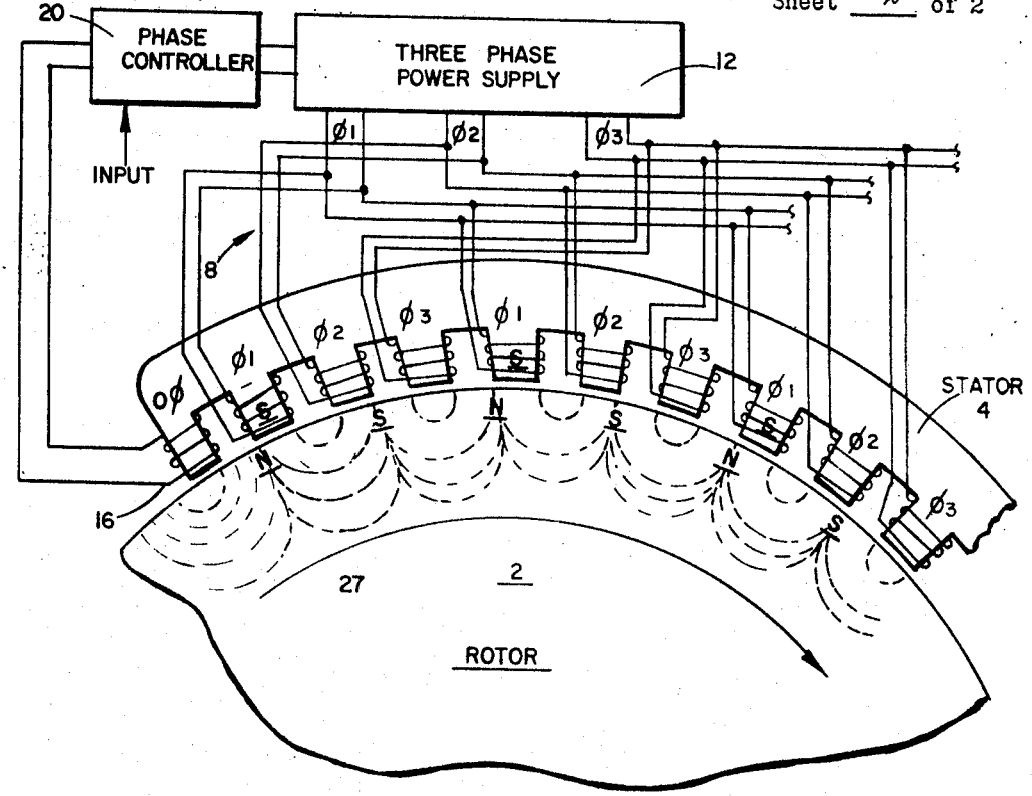
FIGURE 2 contains a cross-sectional view of a portion of a rotor and stator showing a pickup coil and three phase windings.

B. Moorehouse, also describes synchronized oscillators in "Direct Synchronization of the Sinewave Oscillator to a Pulse," Proc. IEE, vol. 113, No. 11, pp. 1775–1782, November 1966. In FIGURE 2 of the article, a simple phase lock oscillator is indicated. In FIGURE 1 of the article, the synchronization of the output signal of the FIGURE 2 circuit to a pulse signal input is a graphically illustrated.

The leading edge of each stator segment is provided with a phase sensing pickup represented in this embodiment by coils 15, 16, 17 and 18, to detect the residual magnetic phase pattern of the portion of the rotor passing under the leading edge of that segment.

The phases of the power supplies are shifted by means of the various controllers in response to the signals which appear on the pickup coils so that the signals on the windings from the power supplies to the stator segments are aligned with the phases of the magnetic patterns detected by the pickup coils. In that manner the magnetic patterns established in the stator by the power supply currents are in phase with the rotor pattern generated by the windings of a previous stator. One example of the shape of the pickup signal is shown on the conductor from winding 16. The other signals are similar to the signal shown.

Alternatively, the power supply for one segment may be synchronized by the input signal and used as a master or controlling supply. The power supplies for the remaining segments may be similarly synchronized for starting, but switched afterwards so as to be directly controlled by the signals from their respective pickups as synchronous speed is approached. This is symbolized in FIGURE 1 by the inclusion of switches 23, 24, 25 and 26. As indicated, switch 23 is open so that power supply 12 is directly synchronized by the input power source. Switches 24, 25 and 26 are closed, indicating that the corresponding power supplies are phase synchronized with supply 12, as described above. It should be understood that with such an arrangement, any one of the power supplies may serve as the "master" if its corresponding switch is open and the remaining three are closed. For starting, all switches may be opened. Although manual switches are illustrated, other mechanical or electrical switches could also be used within the scope or the invention.

The operation of each of the controller and power supply units associated with each of the segments is described in connection with controller 20. Controller 20, in the FIGURE 1 embodiment, may comprise a phase comparator which produces a signal as a function of the phase difference between the input and signal sensed by coil 16. The controller also includes a variable lead-lag network which responds to the phase difference signal. The resultant output to power supply 12 is a signal having the basic frequency of the input signal and phase-locked to the pickup signal from coil 16. The power supply may be a polyphase multivibrator or chopper, using a DC power input, controlled by the signal from the controller 19.

However, as is well known to those skilled in the art, the input signal may be the primary power supply, derived from polyphase frequency controlled power lines. In that case, controller 20 would operate in the same manner as described above, with the lead-lag network adjusting all phases of the power input, to provide a direct polyphase (frequency and phase controlled) output to the corresponding motor segment.

The operation of the motor can best be explained in connection with FIGURE 2 wherein is shown a cross-sectional view of a portion of rotor 2, and stator 4, including pickup coil 16, and the three phases of windings 8.

The pattern of residual magnetism established in the rotor ring by the plurality of stators, is symbolized by the indicated flux lines 27 which generate the sequence of north and south poles shown. As is well known by those skilled in the art, polyphase windings in a motor stator produce the equivalent of a rotating or progressing sequence of north and south poles on the face of the stator element progressing in synchronism with the power input signal. This is symbolized in FIGURE 2 by labelling the poles associated with phase 1 as south poles. The equivalent north poles will occur mid-way between the poles associated with phases 2 and 3. The pattern illustrated is an instantaneous view of the field conditions at a particular time. There is a force of attraction between the equivalent poles of the stator and the residual poles of opposite polarity on the rotor together with a force of repulsion between poles of like polarity on rotor and stator, respectively. As indicated, the result is a tangential force which applies a torque in the direction of rotor rotation.

The critical factor in alignment is that the relative location of rotor and stator poles be such that the driving forces are generated without sufficient misalignment to cause the magnetic material of the rotor to change its state of magnetization. If this alignment is not maintained, the effective torque may be reduced and the action of changing rotor magnetization will result in hysteresis loss being generated in the rotor material.

Although the figures indicate a salient pole form for the stator elements, this has been used for convenience of illustration and is not essential to the functioning of the device. Any of the known forms of polyphase motor winding may be appropriately adapted for use in such a segmented stator motor. Also, it should be noted that the pole form and location of the sensor coil unit may be different from those of the rest of the segment.

Although the invention has been described and illustrated in detail, it is to be understood that the same is by way of illustration and example only, and is not to be taken by way of limitation; the spirit and scope of this invention being limited only by the terms of the appended claims.

We claim:
1. A synchronous motor comprising,
   a magnetizable rotor,
   stator means comprising a plurality of stator members positioned around the circumference of said rotor for inducing a magnetic pattern in the rotor, each of said members including polyphase windings and a phase alignment sensor for synchronizing the phase of the magnetic pattern induced by each stator member with the phase of the magnetic pattern in the rotor.

2. The combination as recited in claim 1, wherein independent polyphase power supply means provide voltage and current to each of said polyphase windings, and said phase alignment sensor includes means connected to each of said power supply means for synchronizing the phases of said voltage and current whereby the magnetic patterns produced thereby are in phase.

3. The combination as recited in claim 1, wherein independent polyphase power supply means provide voltage and current to each of said polyphase windings, and said phase alignment sensor includes means connected to each of said power supply means for synchronizing the phases of said voltage and current whereby the magnetic patterns produced thereby are in phase,
   switch means interposed between each sensor and power supply for interrupting the electrical connection to at least one sensor and power supply for making said power supply a phase reference for the other supplies.

4. The combination as recited in claim 1, wherein independent polyphase power supply means provides voltage and current to each of said polyphase windings, and said phase alignment sensor includes means connected to each of said power supply means for synchronizing the phases of said voltage and current whereby the magnetic patterns produced thereby are in phase, and wherein an individual controller means is connected to at least one of said power supply means, and controller means having an input signal for controlling the frequency output of said power supply means.

5. The combination as recited in claim 1, wherein a polyphase power supply is connected to each of said stator members, said power supply means being at least a two phase supply and said polyphase windings having at least two phases, including means for connecting one of said supply means as a phase reference power supply.

6. The combination as recited in claim 1, wherein said phase alignment sensor comprises a single coil wound on each stator segment at the leading edge thereof for sensing the magnetic pattern in the rotor passing under said leading edge.

7. In combination,
rotor means of a synchronous motor,
a plurality of polyphase power supply means including means for regulating the frequency thereof,
a plurality of segmented stator means disposed about said rotor means for imparting torque to the rotor including polyphase windings disposed in each of said stator means for inducing a magnetic pattern in said rotor as the rotor passes under said stator means, each of said stator means being connected to an individual one of said power supply means,
sensor means disposed in each of said stator means for detecting the magnetic pattern of the rotor passing under the leading edge of each stator means and for aligning the phase of voltage and current in its polyphase winding whereby the magnetic pattern produced thereby is in phase with said detected magnetic phase pattern.

8. In combination,
rotor means of a synchronous motor,
a plurality of segmented stator means disposed about said rotor means including means for generating polyphase signals for the stator segments for magnetizing the portions of said rotor means underneath said stator means and further including means for aligning the phases of each of said polyphase signals with the phases of the magnetic patterns generated in the rotor by the other stator means,
switch means connected between each of said stator means and said means for generating, for disconnecting a selected stator means from the means for generating associated with said stator means, whereby the means for generating provides a reference signal for the remaining means for generating.

References Cited
UNITED STATES PATENTS

| 2,648,021 | 8/1953 | Kaczor et al. | 310—258 |
| 2,648,786 | 8/1953 | Kritter | 310—46 |
| 3,280,398 | 10/1966 | Marie | 318—166 |
| 3,344,325 | 9/1967 | Sklaroff | 310—49 XR |

ORIS L. RADER, *Primary Examiner.*

G. Z. RUBINSON, *Assistant Examiner.*

U.S. Cl. X.R.
310—46, 179, 254